United States Patent
Lin (10) Patent No.: US 7,200,133 B2
(45) Date of Patent: Apr. 3, 2007

(54) RAKE FINGER RECEIVER AND METHOD THEREFOR IN A SPREAD SPECTRUM COMMUNICATION SYSTEM

(75) Inventor: Che-Li Lin, Taipei (TW)

(73) Assignee: Benq Corporation, Taoyuan (TW)

(*) Notice: Subject to any disclaimer, the term of this patent is extended or adjusted under 35 U.S.C. 154(b) by 1069 days.

(21) Appl. No.: 10/285,435

(22) Filed: Nov. 1, 2002

(65) Prior Publication Data
US 2003/0095530 A1    May 22, 2003

(30) Foreign Application Priority Data
Nov. 2, 2001    (TW) ............................. 90127367 A (51) Int. Cl.
H04B 7/216    (2006.01)
(52) U.S. Cl. .................... 370/342; 370/441; 375/150
(58) Field of Classification Search ................ 375/142, 375/148, 149, 150; 370/342, 441
See application file for complete search history.

(56) References Cited

U.S. PATENT DOCUMENTS

| | | | |
|---|---|---|---|
| 5,648,983 A | 7/1997 | Kostic et al. | 375/150 |
| 5,654,979 A * | 8/1997 | Levin et al. | 375/142 |
| 6,560,273 B1 | 5/2003 | Sourour et al. | 375/148 |

FOREIGN PATENT DOCUMENTS

| | | |
|---|---|---|
| TW | 461194 | 10/2001 |
| WO | 99/63677 | 12/1999 |
| WO | 00/21201 | 4/2000 |

* cited by examiner

Primary Examiner—John Pezzlo
(74) Attorney, Agent, or Firm—Rabin & Berdo, P.C.

(57) ABSTRACT

A rake finger receiver and control method therefor, for use in a wireless spread communication system. The rake finger receiver includes a multiplexer, a searcher, a first switch fabric, a rake fingers and tracking pool, a second switch fabric, a combiner, a decoder, a channel estimator, and a rake finger controller. One searcher is used to serve multiple antennas of a base station so as to reduce the system complexity. The number of the rake fingers assigned for processing multipath components associated with a radio link is determined dynamically. Thus, the resource is utilized efficiently.

11 Claims, 5 Drawing Sheets

RAKE FINGER RECEIVER AND METHOD THEREFOR IN A SPREAD SPECTRUM COMMUNICATION SYSTEM

This application incorporates by reference Taiwan application Serial No. 090127367, filed on Nov. 2, 2001.

BACKGROUND OF THE INVENTION

1. Field of the Invention

The invention relates in general to a rake finger receiver and method thereof, and more particularly to a rake finger receiver and method therefor in a spread spectrum communication system.

2. Description of the Related Art

Figure 1:
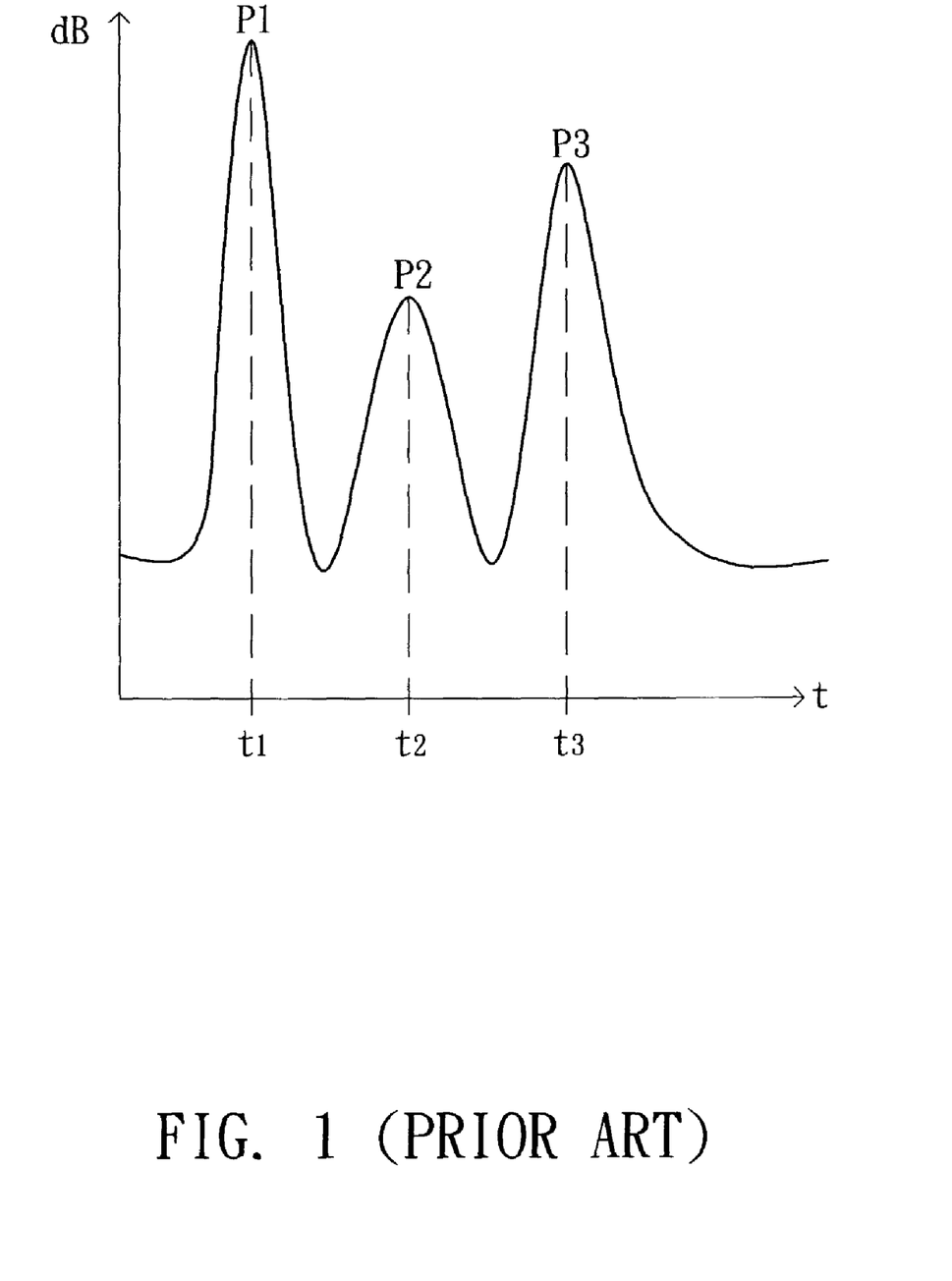
FIG. 1 (Prior Art) is a time delay power spectrum of the multipath components received by a base station.

In a spread spectrum communication system, such as CDMA (Code Division Multiplexing Access) system, a mobile station requests a unique pseudo-random code (PN), called spreading code, from a base station for transmitting data. Every mobile station generates a spread signal for data transmission according to a unique spreading code. The receiver of the base station despreads the received spread signal from the mobile station according to the corresponding spreading code of the mobile station. However, there is a to-be-solved issue, multipath. Multipath is the propagation phenomenon that results in radio signals' reaching the receiving antenna by two or more paths, and the received signal from one of the paths is called a multipath component. Causes of multipath include atmospheric ducting, ionospheric reflection and refraction, and reflection from terrestrial objects. The terrestrial objects can be mountains or buildings, for example. The arrival time of each multipath component is different. FIG. 1 is the time delay power spectrum of the multipath components received by the base station. Multipath components P1, P2, and P3 represent the same information bit, and the different arrival time of each multipath component is due to the propagation delay. The arrival times of each of the multipath components P1, P2, and P3 are t1, t2, and t3, respectively.

In a wireless spread spectrum communication system, a rake receiver is a popular receiver architecture for use in multipath propagation environment. The rake receiver demodulates the wireless signals received by different antennas and outputs the information bits originated from the respective mobile stations. Generally, the rake receiver includes multiple rake fingers and combiners. Each rake finger receives a multipath component, and produces a demodulated signal by adjusting the time delay of the received multipath component and then despreading the adjusted multipath component. The combiner combines the despreaded signals that belong to the same radio link and are outputted by the rake fingers using, for example, the maximum ratio combining technique, in order to obtain the maximum signal to noise ratio (S/N ratio), and thus the bit error rate is reduced. Two estimation techniques are used to obtain the characteristics of the channel. One is to obtain the time delay information of each multipath component for accurately despreading the received signal. The other is to obtain the channelweights, such as the relative amplitude and phase information among the multipath components.

SUMMARY OF THE INVENTION

It is therefore an object of the invention to provide a rake finger receiver and method for the rake finger receiver so as to demodulate the information bits that are originated from respective mobile stations and transmitted in multipath propagation environment. The rake finger receiver can achieve reduced system complexity, optimized system performance, and enhanced utilization of rake fingers.

The invention achieves the above-identified object by providing a rake finger receiver, for use in a wireless spread communication system. The wireless spread communication system includes a base station and a plurality of mobile stations. Each mobile station establishes a radio link to the base station so as to transmit a spread signal indicative of a plurality of information bits. The spread signals are transmitted in an environment with multipath interference so that a plurality of multipath components are generated in each of the spread signals. The base station includes a plurality of antennas, each of which receives a wireless signal and outputting an antenna output signal. The rake finger receiver includes a multiplexer, a searcher, a first switch fabric, a rake fingers and tracking pool, a second switch fabric, a combiner, a decoder, a channel estimator, and a rake finger controller. The multiplexer, coupled to the antennas, is used for receiving the antenna output signals, selecting one of the antenna output signals as a input signal, according to a multiplex control signal, and outputting the input signal. The searcher, coupled to the multiplexer, is used for receiving the input signal, searching the input signal for delay times of the multipath components corresponding to one of the radio links in the input signal, and outputting a propagation delay signal according to the delay times. The first switch fabric includes a plurality of input terminals and a plurality of output terminals, wherein the input terminals are coupled to the antennas respectively. The first switch fabric is used for receiving the antenna output signals and outputting a plurality of first switch signals according to a first switch control signal. The rake fingers and tracking pool includes a plurality of rake fingers coupled to the respective output terminals of the first switch fabric, wherein each of the rake fingers receives at most one of the first switch signals, and produces a despread signal by despreading the received first switch signal and adjusting the propagation delay of the received switch signal, according to a rake finger control signal. The second switch fabric, coupled to the rake fingers, is used for receiving the despread signals and outputting a plurality of switched despread signals according to a second switch control signal. The combiner, coupled to the second switch fabric, is used for producing a combined signal by combining the switched despread signals according to the output of the channel estimator. The decoder, coupled to the combiner, for decoding the combined signal and producing a decoded signal by obtaining the information bits from the combined signal. The channel estimator, coupled to the rake finger controller, is used for estimating channel characteristics of the despread signals and outputting the channel characteristic parameters. The rake finger controller is coupled to the searcher, the combiner, the decoder, and the channel estimator. The rake finger controller is used for controlling the rake finger receiver, the multiplexer, the searcher, the first switch fabric, and the second switch fabric.

The invention achieves the above-identified object by providing a control method for sharing a searcher, for use in a base station. The base station includes a plurality of antennas and a rake finger receiver. Each of the antennas receives a radio signal and outputs an antenna output signal according to the received radio signal. The rake finger receiver receives the antenna output signals and outputs a plurality of information bits according to the received antenna output signals. The rake finger receiver includes the searcher and a search queue, wherein when a radio link is established, the rake finger receiver generates a search request and puts the search request into the search queue. The control method includes the following steps. First, the search request is selected from the search queue. One of the antennas is selectively coupled to the searcher. Next, the searcher receives a corresponding antenna output signal from the one of the antennas coupled to the searcher to search for multipath components.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
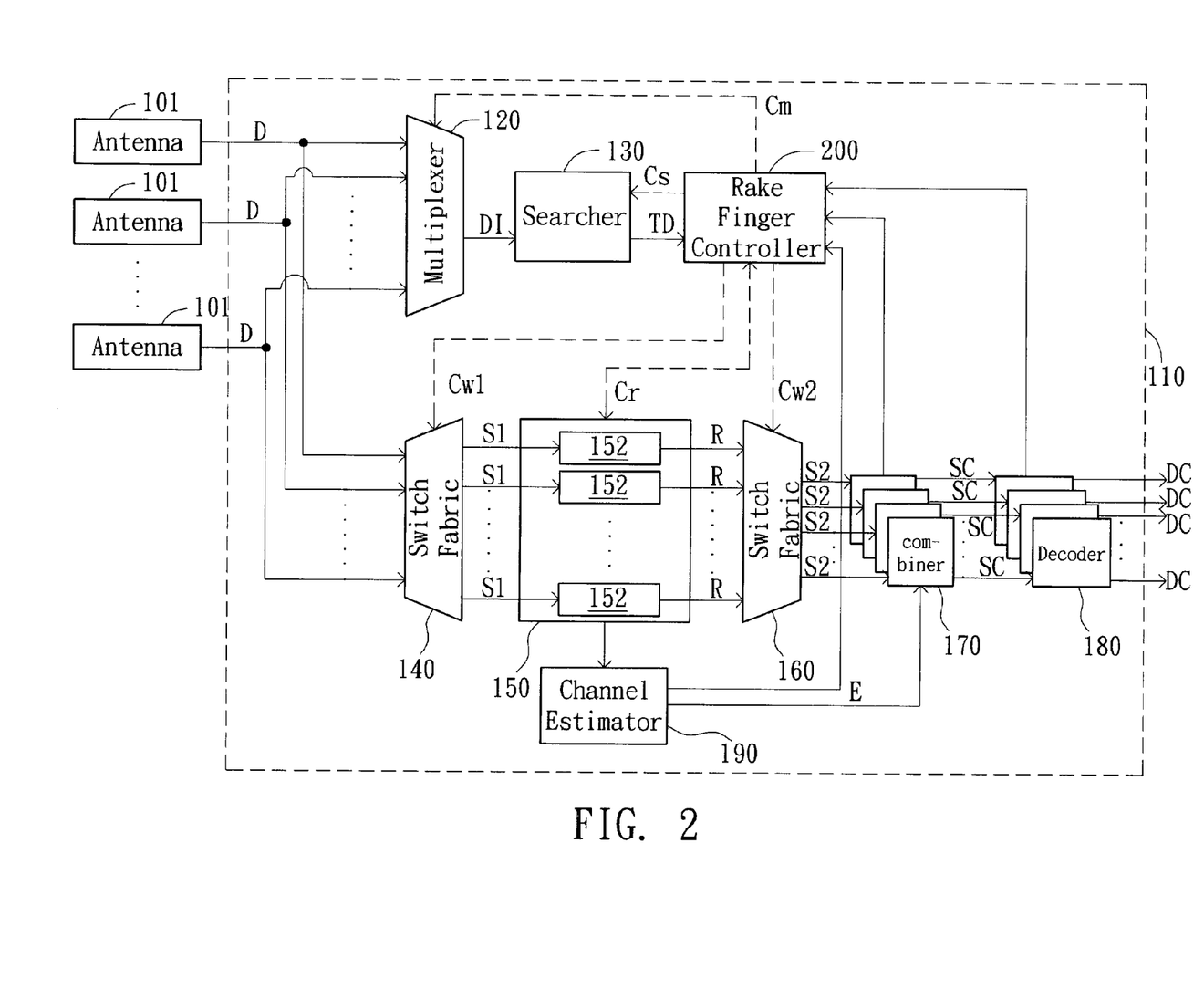
FIG. 2 is a block diagram of a rake finger receiver according to a preferred embodiment of the invention.

Referring first to FIG. 2, a rake finger receiver according to a preferred embodiment of the invention is illustrated. The rake finger receiver 110 is applied in a wireless spread communication system. The wireless spread communication system includes a base station and a plurality of mobile stations. Each mobile station establishes a radio link with the base station for transmitting a spread signal having a plurality of information bits. The spread signals are transmitted in an environment with multipath interference, and the multipath interference makes a plurality of multipath components generated in each of the spread signals. The base station includes a number of antennas, each of which receives a wireless signal and outputs an antenna output signal D. The rake finger receiver 110 includes a multiplexer 120, a searcher 130, a first switch fabric 140, a rake fingers and tracking pool 150, a second switch fabric 160, a combiner 170, a decoder 180, a channel estimator 190, and a rake finger controller 200. Each function block can be implemented by either hardware or software, or by a combination of hardware and software. The rake finger controller 200 is the central control block of the receiver. In addition, the dashed lines from the rake finger controller 200 to other functional blocks represent respective control signals. The multiplexer 120, coupled to the antennas 101, is used for receiving the antenna output signals D, selecting one of the antenna output signals D as a input signal DI according to a multiplex control signal Cm, and outputting the input signal DI. The searcher 130 is coupled to the multiplexer 120, and is used for receiving the input signal DI, searching the input signal DI for delay times of the multipath components of a specific radio link in the input signal DI, and outputting a propagation delay signal TD according to the found delay times, wherein the specific radio link is indicated by a search control signal Cs. Referring to FIG. 1, the propagation delay signal TD is the information corresponding to time t1, t2, and t3, for example. Since the searcher 130 is a computational intensive block and its implementation is complicated, according to the invention, the searcher 130 can be shared with the antennas 101 so as to minimize the number of the searcher 130 and decrease the system complexity. The control method of sharing searcher 130 will be described in detail later.

The first switch fabric 140 includes a number of input terminals and a number of output terminals, wherein the input terminals are coupled to the antennas respectively. The first switch fabric 140 is used for receiving the antenna output signals D and outputting a number of first switch signals S1 according to a first switch control signal Cw1. The rake fingers and tracking pool 150 includes a number of rake fingers 152 coupled to the respective output terminals of the first switch fabric 140. Each rake finger receives at most one of the first switch signals, and produces a despread signal R by despreading the received first switch signal S1 and adjusting the propagation delays of the received first switch signal according to a rake finger control signal Cr. The second switch fabric 160, coupled to the rake fingers 152, is used for receiving the despread signals R and outputting a number of switched despread signals S2 according to a second switch control signal Cw2. The combiner 170 is coupled to the second switch fabric 160, and is used for producing a combined signal SC by combining the switched despread signals S2 according to a channel parameter E. The decoder 180, coupled to the combiner 170, is used for receiving the combined signal SC and obtaining the information bits originated from the mobile station according to the combined signal SC so as to output a decoded signal DC. The channel estimator 190 is coupled to the rake fingers 150, and is used for estimating the channel characteristics of the despread signals R and outputting the channel parameter E according to the channel characteristics.

As described above, the rake finger controller 200 is the central control block of the rake finger receiver 110. The rake finger controller 200 is coupled to the searcher 130, the first switch fabric 140, the rake fingers and tracking pool 150, the combiner 170, the decoder 180, and the channel estimator 190. The rake finger controller 200 outputs the multiplex control signal Cm to cause different antenna output signal D to be fed into the searcher 130. The rake finger controller 200 outputs the search control signal Cs to cause the searcher 130 to search for the multipath components that belong to a specific one of the radio links. The rake finger controller 200 outputs the first switch control signal Cw1 for causing the multipath components of each radio link to be associated with respective ones of the rake fingers 152. In addition, the rake finger controller 200 outputs the second switch control signal Cw2 in order to cause the despread signals R belonging to the same mobile station to be fed into combiner 170. Further, the rake finger control signal Cr can be produced by the rake finger controller 200 in order to control the rake fingers and tracking pool 150.

Figure 3:
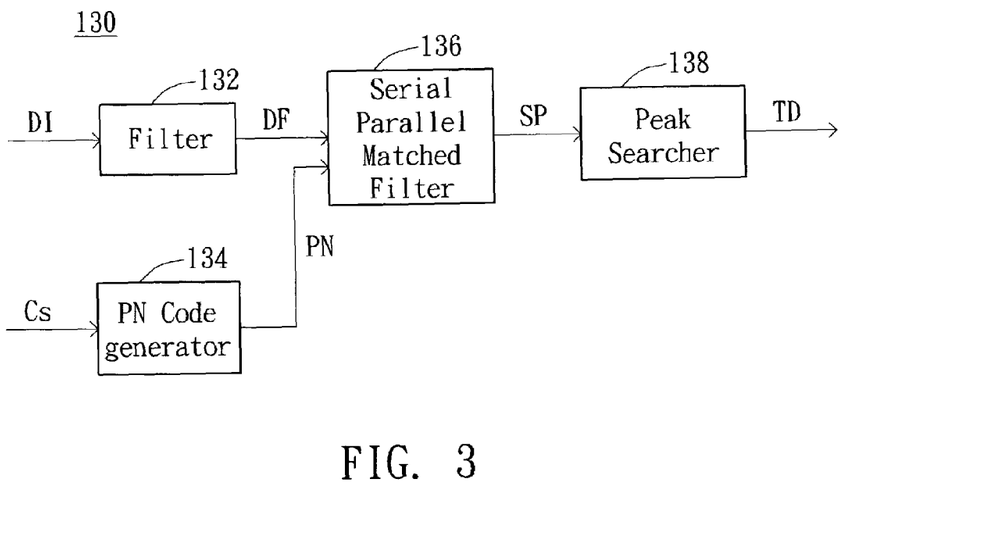
FIG. 3 is a block diagram of the searcher in FIG. 2.

Referring to FIG. 3, the block diagram of the searcher 130 is shown. The searcher 130 includes a filter 132, a Pseudo-Noise (PN) Code generator 134, a serial parallel matched filter 136, and a peak searcher 138. The filter is applied for receiving the input signal DI and outputting a filtered signal DF according to the input signal DI The PN Code generator 134 is applied for receiving the search control signal Cs and generating a PN code according to the search control signal Cs. The serial parallel matched filter 136 is coupled to the filter 132 and the PN code generator 134, for receiving the filtered signal DF and the PN code, and outputting a matched signal SP according to the filtered signal DF and the PN code. The peak searcher 138 is coupled to the serial parallel matched filter 136, for receiving the matched signal SP, searching for the peaks of the matched signal SP, and producing the propagation delay signal TD according to the peaks of the matched signal SP.

Figure 4:
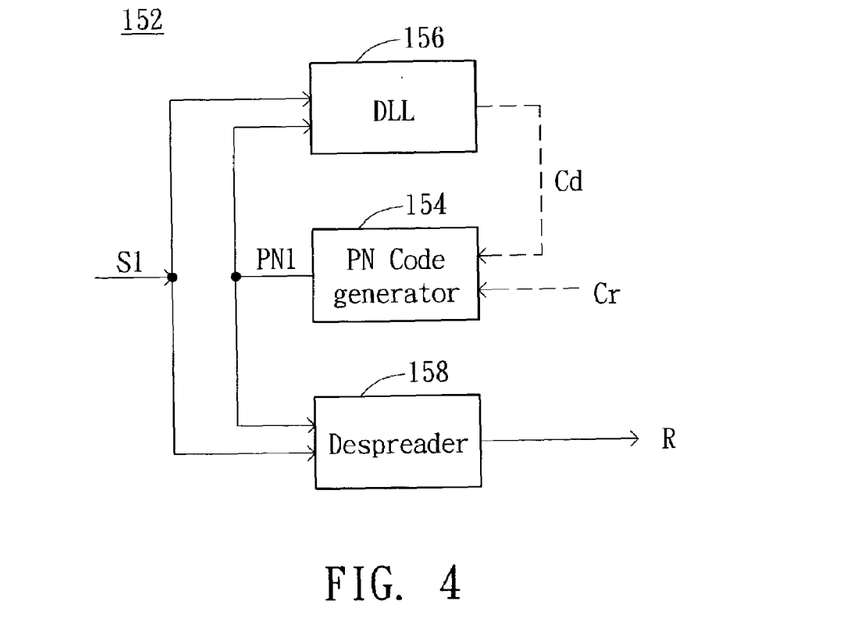
FIG. 4 is a block diagram of one of the rake fingers in FIG. 2.

Referring to FIG. 4, one of the rake fingers 152 is illustrated. The rake finger 152 includes a PN code generator 154, a delay locked loop (DLL) 156, and a despreader 158. The PN code generator 154 is applied for receiving the rake finger control signal Cr and a delay-locked-loop (DLL) control signal Cd, and generating a PN code PN1 according to the rake finger control signal Cr and the DLL control signal Cd. The DLL 156 is applied for receiving the first switch signal S1 and the PN code PN1, and outputting the DLL control signal Cd according to the first switch signal S1 and the PN code PN1, so as to control the phase of the PN code PN1. The despreader 158 is used for receiving the first switch signal S1, despreading the first switch signal S1 according to the PN code PN1, and outputting the despread signal R.

Figure 5:
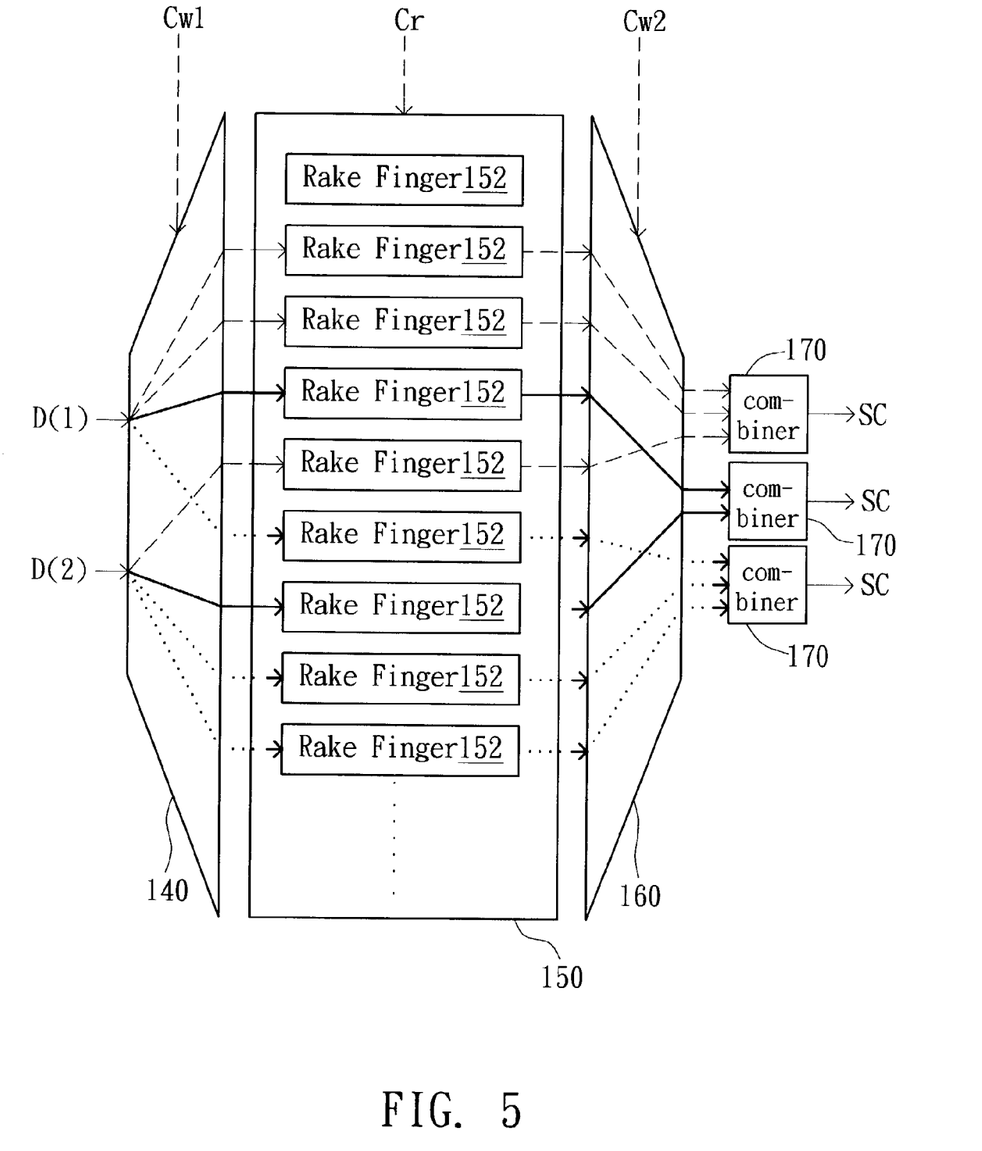
FIG. 5 illustrates the operation of the rake fingers and tracking pool in FIG. 2.

After the description of the structure of the rake finger receiver according to the invention, the operation of the rake finger receiver is to be described. FIG. 5 illustrates the operation of the rake fingers and tracking pool 150. In this embodiment, suppose that a base station has two antennas and three radio links, referred to as C1, C2, and C3, are active. The first switch fabric 140 is used for receiving antenna output signals D(1) and D(2) from the two antennas respectively, wherein each of the antenna output signals, D, includes a spread signal composed of the spread signals transmitted in the respective radio links. The first switch fabric 140 feeds the antenna output signals D(1) and D(2) into the rake fingers 152 according to the first switch control signal Cw1 so that the antenna output signals D(1) and D(2) have respective ones of the rake fingers 152 to process the multipath components thereof. For example, the spread signals in the antenna output signal D(1) are transmitted in the radio links C1, C2, and C3 and have 2, 1, and 1 multipath components to be processed, respectively, and these multipath components are illustrated with 2 dashed lines, 1 solid line, and 1 dotted line originating from an arrow representing D(1), respectively, as shown in FIG. 5. Thus, the first switch fabric 140 feeds the four multipath components of the antenna output signal D(1) into four of the rake fingers 152 to process the respective multipath components. On the other hand, the spread signals in the antenna output signal D(2), transmitted by the radio links C1, C2, and C3, respectively include 1, 1, and 2 multipath components to be processed. In FIG. 5, these multipath components of the antenna output signal D(2) are illustrated with 1 dashed lines, 1 solid line, and 2 dotted line originating from an arrow representing D(2), respectively. Thus, the first switch fabric 140 feeds the antenna output signal D(2) into another four rake fingers. The rake fingers 152 demodulate the respective multipath components according to the rake finger control signal Cr, and output respective demodulated spread signals R to the second switch fabric 160. The second switch fabric 160, then, feeds the demodulated spread signals R into the combiners 170 by the radio link. That is, the demodulated spread signals associated with the same radio link are fed into an identical combiner 170. Each of the combiners 170 can thus combine the received demodulated spread signals associated with one radio link, for example, by the maximum ratio combining technique and outputs the combined signal SC. Conventionally, for a radio link, the number of its multipath components to be processed would be set to a predetermined value. In such case, each radio link can only be assigned a fixed number of the rake fingers 152. Since not every radio link has its multipath components to be processed to the number of the predetermined value, the rake fingers 152 would be used inefficiently. In contrast, the rake finger controller 200 according to the invention is to dynamically determine the numbers of multipath components that are allowed to be processed for respective radio links according to the search result obtained from the searcher 130, and to assign the rake fingers 152 to the radio links according to the allowed numbers of multipath components. The assignment of the rake fingers 152 can, for example, depend on the instantaneously wireless channel characteristics, the number of concurrent radio links, or the quality of service agreement of each radio link. Because the rake fingers 152 can be assigned dynamically, there will be a statistically multiplexing gain; that is, the total amount of rake fingers and tracking units in the pool is smaller than the amount of those of a statically assigned system. Therefore, the efficient use of the rake fingers 152 is achieved.

As described above, the rake finger controller 200 is the central control unit in the rake finger receiver 110, and it dispatches the available resource to achieve the system performance requirement. The serial parallel matched filter 136 in the searcher 130 is a computational intensive block no matter it is implemented by hardware or software. Therefore, in the invention, the number of searchers is made much smaller than the number of simultaneous radio links to be served to reduce the system complexity. As shown in FIG. 2, one searcher is used to serve a number of radio links. In other words, the searcher 130 is shared with a number of antennas 101 in order to serve the radio links. Each setup radio link can be in various states. In addition, the rake finger controller 200 maintains these states and controls the state transition of each radio link.

Figure 6:
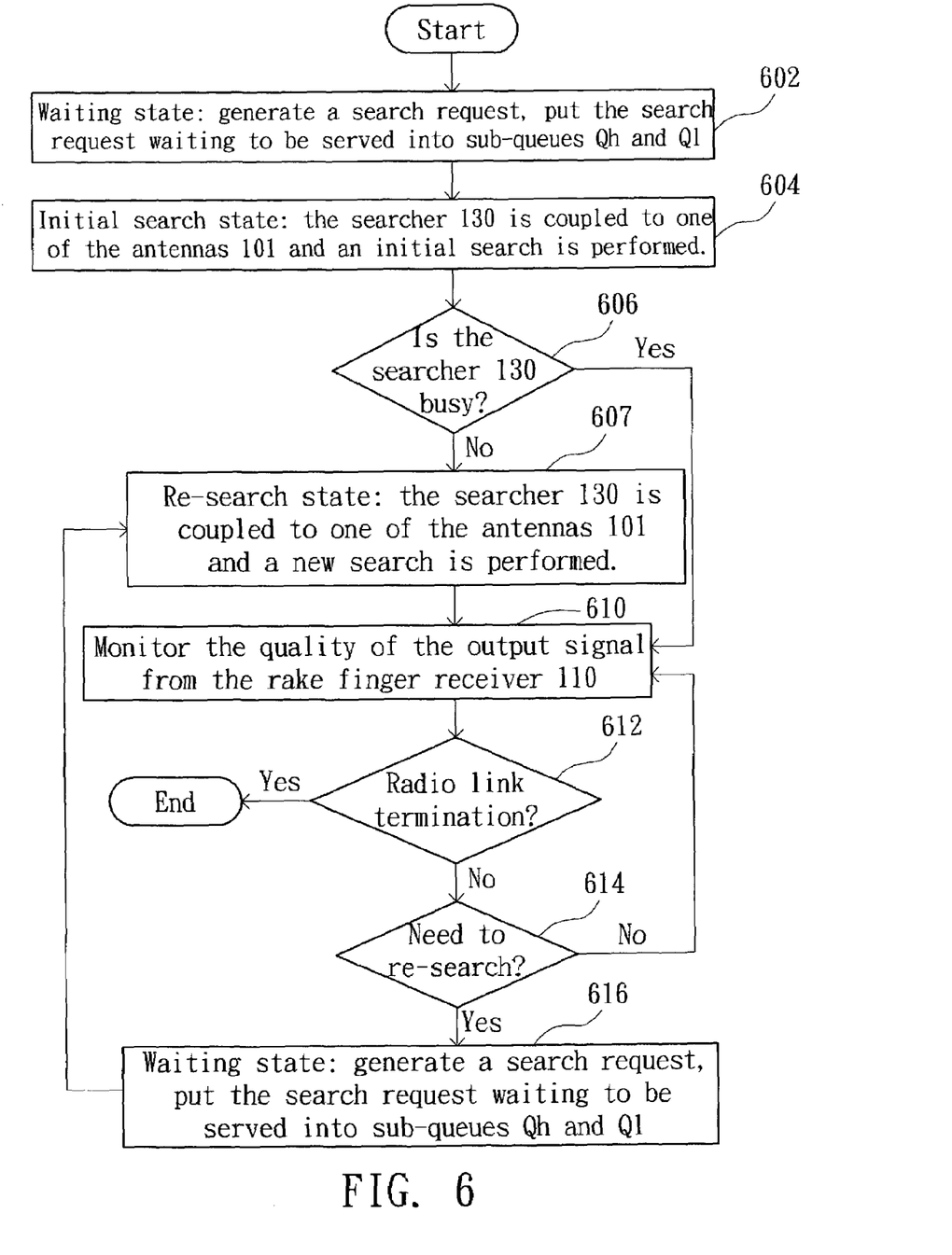
FIG. 6 is a state transition diagram for a radio link.

FIG. 6 is a state transition diagram for a radio link. The searcher 130 includes a search queue Q. The search queue Q can include a plurality of sub-queues, each of which is associated with a different priority. Take a high priority sub-queue Qh and a low priority sub-queue Ql for example. When a radio link is setting up, the rake finger controller 200 generates a search request according to the radio link and puts the search request into either the high priority sub-queue Qh or the low priority sub-queue Ql of the search queue Q according to the priority of the search request, as indicated in step 602; a waiting state is entered. The priority of the search request can be set according to, for example, the quality of service or urgency of the call. The rake finger controller 200 processes the search requests in the search queue Q according to the corresponding priorities in sequence. When a search request of a specific radio link is processed for the first time, an initial search state is entered. In the initial search state, one of the antennas 101 is coupled to the searcher 130, and the searcher 130 performs an initial search for multipath components, as indicated in step 604, wherein a less-precise but efficient algorithm can be applied in the initial search. Next, as shown in step 606, it is determined whether the searcher 130 is busy. If not, step 607 is performed. If so, step 610 is performed. In step 607, a re-search state is entered, one of the antennas 101 is coupled to the searcher 130, and the searcher 130 performs a new search for multipath components according to the search request and an appropriate algorithm for the new search, wherein a more-precise but less-efficient algorithm can be applied to the new search. To be precise, the searcher 130 receives antenna output signals D, performs a new search for multipath components in the antenna output signals D that belong to the specific radio link according to the search request, and outputs a transmission time delay signal TD according to the multipath components, wherein the radio link is indicated by the search request. The method, then, proceeds to step 610. In step 610, the quality of an output signal from the rake finger receiver 110 is monitored, wherein the output signal is associated with the specific radio link. Next, it is determined whether the radio link is terminated, as indicated in step 612. If so, the method ends; otherwise, step 614 is performed. In step 614, a determination is made whether it is necessary to perform a new search according to the result of the monitoring in step 610. In the determination of step 614, the rake finger controller 200 can check, for example, the radio link's error rate performance or lost-locked condition, to determine whether the radio link needs to be re-searched or not. If it does not need to perform a new search, the method proceeds to step 610 to continue to monitor the quality of the output signal from the rake finger receiver 110. If it is necessary to perform a new search, for example, because the signal quality is poor, the method enters a waiting state. In the waiting state, a new search request of the radio link is generated and is put into the search queue Q, that is, either the high priority sub-queue Qh or the low priority sub-queue Q1, according to the priority of the new search request, as shown in step 616. The method maintains in the waiting state and the new search request is waiting to be served, until the new search request is processed. When the new search request is processed, the method proceeds to step 607.

In the initial state, the base station has the least information about the mobile station and has to estimate the time delay information in the shortest time to receive the uplink data. Thus, a less-precise but efficient algorithm can be applied to the initial search. For example, under receiving diversity case, the base station receives the signal from a mobile station from two antennas. To speed up the search process in the initial search state, it is to assume that the delay paths from the two diversity antennas are nearly the same. Therefore, the signal between two antennas can be switched into the searcher with a period of noncoherent summation time. At the end of the initial search, the searched peaks for the two antennas will be the same. By doing this, the antenna diversity gain is obtained while the time required to search signals from the two antennas cut down by half. Besides, the searching period of initial search state can be set to be shorter than that of the re-search state. Afterwards, a more-precise but less-efficient algorithm can be applied in the re-search state. At the end of the re-search state, a more accurate output signal associated with the radio link can be obtained. In addition, when the output signal for the radio link is being monitored, the searcher does not serve for this radio link, and may be, for example, in the initial search or re-search states for other radio links. Thus, the utilization of the searcher is increased and a searcher shared among many radio links is achieved.

As disclosed above, the rake finger receiver and the method thereof have the following advantages:

1. Reduced complexity system is provided. One searcher is shared with a plurality of antennas so that the reduced complexity of the system is achieved.

2. Optimization of the system performance. According to the invention, a method for sharing a searcher is provided. The method uses search queues associated with different priorities and different algorithms is applied to the method under different requirements. Thus, the optimization of the system performance is achieved.

3. Enhanced utilization of rake fingers. Since the number of rake fingers for each radio link is assigned dynamically, the rake fingers are more efficiently used.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rake finger receiver, for use in a wireless spread communication system, the wireless spread communication system including a base station and a plurality of mobile stations, each mobile station establishing a radio link to the base station so as to transmit a spread signal indicative of a plurality of information bits, the spread signals being transmitted in an environment with multipath interference so that a plurality of multipath components are generated in each of the spread signals, the base station including a plurality of antennas, each antenna receiving a wireless signal and outputting an antenna output signal, the rake finger receiver comprising:

a multiplexer, coupled to the antennas, for receiving the antenna output signals, selecting one of the antenna output signals as an input signal according to a multiplex control signal, and outputting the input signal;

a searcher, coupled to the multiplexer, for receiving the input signal, searching the input signal, according to a search control signal, for delay times of the multipath components corresponding to one of the radio links in the input signal, and outputting a propagation delay signal according to the delay times;

a first switch fabric, including a plurality of input terminals and a plurality of output terminals, wherein the input terminals are coupled to the antennas respectively, and the first switch fabric is used for receiving the antenna output signals and outputting a plurality of first switch signals according to a first switch control signal;

a rake fingers and tracking pool, including a plurality of rake fingers coupled to the respective output terminals of the first switch fabric, wherein each of the rake fingers receives at most one of the first switch signals, and produces a despread signal by despreading the received first switch signal and adjusting the propagation delay of the received switch signal, according to a rake finger control signal;

a second switch fabric, coupled to the rake fingers, for receiving the despread signals and outputting a plurality of switched despread signals according to a second switch control signal;

a combiner, coupled to the second switch fabric, for producing a combined signal by combining the switched despread signals according to channel parameters;

a decoder, coupled to the combiner, for receiving the combined signal and producing a decoded signal by obtaining the information bits from the combined signal;

a channel estimator, coupled to the rake fingers, for estimating channel characteristics of the despread signals and outputting the channel parameters according to the channel characteristics; and a rake finger controller, coupled to the searcher, the rake fingers and tracking pool, the combiner, the decoder, and the channel estimator, the rake finger controller being used for controlling the rake finger receiver and outputting the multiplex control signal, the search control signal, the first switch control signal, and the second switch control signal.

2. The rake finger receiver according to claim 1, wherein the searcher comprises:
- a filter, for receiving the input signal and outputting a filtered signal according to the input signal;
- a Pseudo-Noise (PN) Code generator, for receiving the search control signal and generating a PN code according to the search control signal;
- a serial parallel matched filter, coupled to the filter and the PN code generator, for receiving the filtered signal and the PN code, and outputting a matched signal according to the filtered signal and the PN code; and
- a peak searcher, coupled to the serial parallel matched filter, for receiving the matched signal, searching for the peaks of the matched signal, and outputting the propagation delay signal according to the peaks of the matched signal.

3. The rake finger receiver according to claim 1, wherein each of the rake fingers comprises:
- a PN code generator, for receiving the rake control signal and a delay-locked-loop (DLL) control signal, and generating a PN code according to the rake finger control signal and the DLL control signal;
- a delay locked loop (DLL), for receiving the first switch signal and the PN code, and outputting the DLL control signal according to the first switch signal and the PN code, so as to control the phase of the PN code; and
- a despreader, for receiving the first switch signal, despreading the first switch signal according to the PN code, and outputting the despread signal.

4. The rake finger receiver according to claim 1, wherein the combiner utilizes a maximum ratio combining technique to combine the second switch signals according to the channel parameters.

5. A control method for sharing a searcher, for use in a base station, the base station including a plurality of antennas and a rake finger receiver, each of the antennas receiving a radio signal and outputting an antenna output signal according to the received radio signal, the rake finger receiver receiving the antenna output signals and outputting a plurality of information bits according to the received antenna output signals, the rake finger receiver including the searcher and a search queue, wherein when a radio link is established, the rake finger receiver generates a search request and puts the search request into the search queue, the control method comprising the steps of:
- selecting the search request from the search queue;
- selectively coupling one of the antennas to the searcher;
- at the searcher, receiving a corresponding antenna output signal from the one of the antennas coupled to the searcher, searching for a multipath component which the corresponding antenna output signal includes according to the search request, and outputting a propagation delay signal according to the multipath component; and
- monitoring the quality of an output signal from the rake finger receiver, wherein the output signal is associated with the radio link.

6. The control method according to claim 5, wherein the search queue includes a plurality of sub-queues, associated with different priorities, and the search request is put into one of the sub-queues according to the priority of the search request.

7. The control method according to claim 5, wherein the monitoring step comprises the step of:
- putting the search request into the search queue again if it is found that the quality of the output signal from the rake finger receiver is low in degree.

8. A control method for sharing a searcher, for use in a base station, the base station including a plurality of antennas and a rake finger receiver, the antennas receiving respective radio signals and outputting respective antenna output signals according to the respective received radio signals, the rake finger receiver receiving the antenna output signals and outputting a plurality of information bits according to the received antenna output signals, the rake finger receiver including the searcher and a search queue, wherein when a radio link is established, the rake finger receiver generates a search request and puts the search request into the search queue, the control method comprising the steps of:
- selecting the search request from the search queue;
- entering an initial search state, wherein the searcher is coupled to one of the antennas, and the searcher performs an initial search for a multipath component according to the search request and an appropriate algorithm for the initial search;
- entering a re-search state, wherein the searcher is coupled to one of the antennas, and the searcher performs a new search for a multipath component according to the search request and an appropriate algorithm for the new search;
- monitoring the quality of an output signal from the rake finger receiver, wherein the output signal is associated with the radio link; and
- entering a waiting state until the search request is processed, wherein the search request is put into the search queue, and entering the re-search state if the search request is processed.

9. The control method according to claim 8, wherein the search queue includes a plurality of sub-queues, associated with respective priorities, and the search request is put into one of the sub-queues according to the priority of the search request.

10. The control method according to claim 9, wherein the method the monitoring step comprises the step of:
- regenerating a search request associated with the radio link and putting the search request into one of the sub-queues of the search queue according to the priority of the search queue if it is found that the quality of the output signal from the rake finger receiver is low in degree.

11. The control method according to claim 8, wherein the monitoring step comprises the step of:
- regenerating a search request associated with the radio link and putting the search request into the search queue according to the priority of the search queue if it is found that the quality of the output signal from the rake finger receiver is low in degree.

* * * * *